United States Patent [19]

Granlund

[11] 3,723,965
[45] Mar. 27, 1973

[54] CONTROL UNIT FOR MONITORING ELECTRONIC CONTROL SYSTEMS FOR BRAKING DEVICES IN WHEELED VEHICLES

[75] Inventor: Gosta Holger Granlund, Goteborg, Sweden

[73] Assignee: Saab-Scania Aktiebolag, Linkoping, Sweden

[22] Filed: Mar. 8, 1971

[21] Appl. No.: 122,018

[30] Foreign Application Priority Data

Mar. 13, 1970 Sweden .................................. 3350/70

[52] U.S. Cl. ................ 340/53, 188/181 C, 303/21 B
[51] Int. Cl. ................................................. B60t 8/10
[58] Field of Search ........ 340/52, 52 B, 53, 262, 263; 303/21 EB, 21; 188/181, 181 C

[56] References Cited

UNITED STATES PATENTS

| 3,606,491 | 9/1971 | Walsh | 188/181 C X |
| 3,606,493 | 9/1971 | Schlitz et al. | 303/21 CF |
| 3,610,362 | 10/1971 | Toyama | 188/181 C UX |
| 2,930,026 | 3/1960 | Steigerwald | 340/52 R |
| 3,586,387 | 6/1971 | Riordan | 303/21 B |
| 3,614,172 | 11/1971 | Riordan | 303/21 B |

Primary Examiner—Alvin H. Waring
Attorney—Pierce, Scheffler & Parker

[57] ABSTRACT

An arrangement for controlling and monitoring electronic control systems for the brakes of wheeled vehicles (motor cars) includes speed sensors, one for each controlled wheel, the output of each sensor being applied to a detector for detecting relative changes in speed of the wheel. The detector controls a number of solenoid valves to regulate the brake pressures for the individual wheels such that locking and skidding of any wheel is prevented. A delay circuit samples or senses the signal occurring in the output of the detector, which output is supplied to a driving stage driving the associated solenoid valve. The output of the delay circuit activates a comparator when the output of the detector results in a reduction or release of the braking power of one or more of the wheels of the vehicle during a period exceeding a normal transient period of the regulating system. When the comparator is activated, it energizes a switch provided for the associated driving stage such that the polarity of the output of this stage changes and results in switching on again the solenoid valve to open a braking-fluid connection to the normal, ordinary braking system of the vehicle. When the comparator is energized, a buzzer or signal lamp is also energized.

3 Claims, 2 Drawing Figures

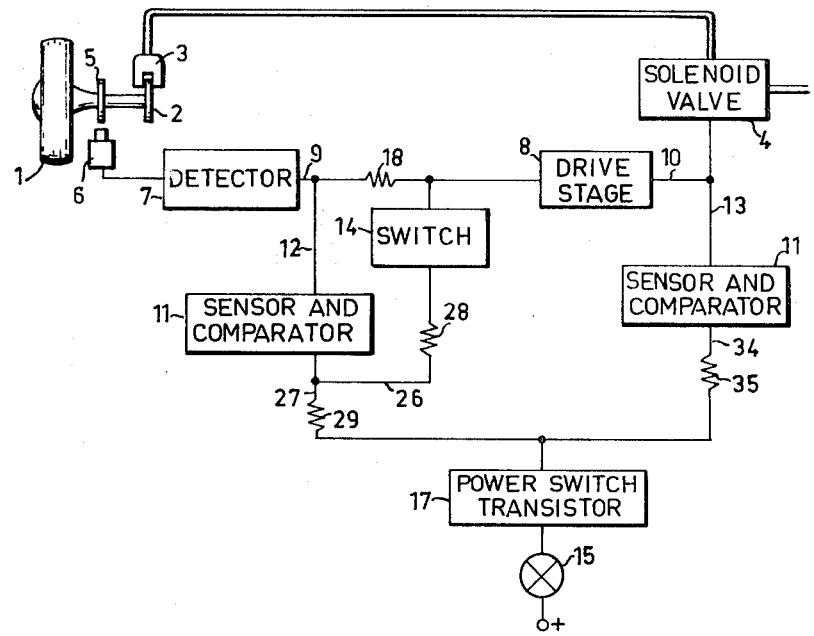
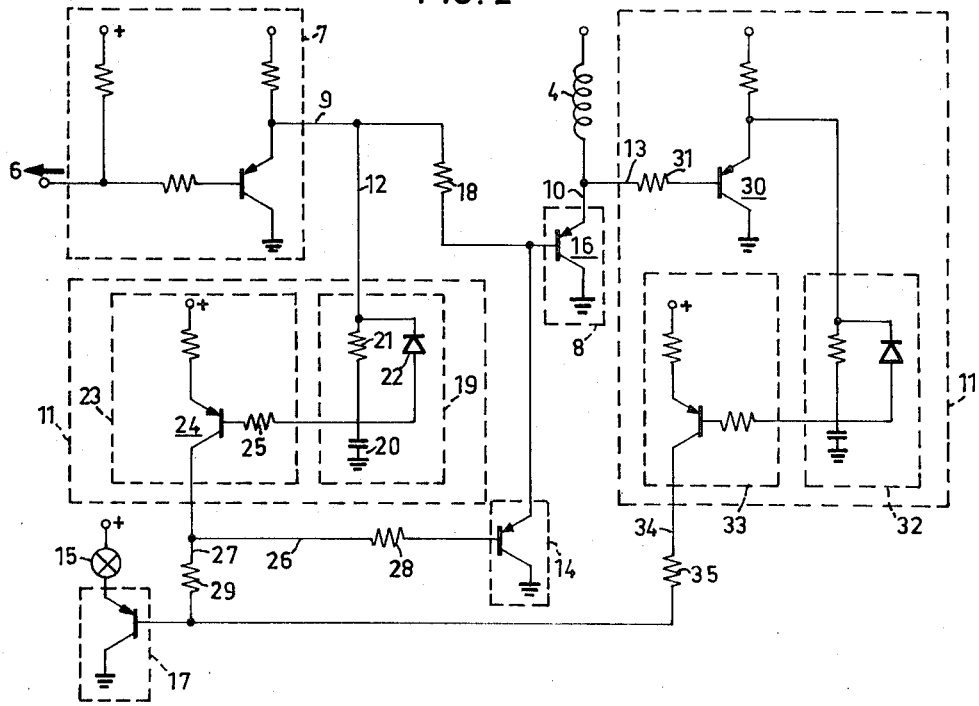

CONTROL UNIT FOR MONITORING ELECTRONIC CONTROL SYSTEMS FOR BRAKING DEVICES IN WHEELED VEHICLES

The present invention relates to a control unit for monitoring electronic control systems for braking devices in wheeled vehicles, including speed sensing input means which produce speed-representing signals for a detector unit which during a braking sequence detects relative changes in wheel speed and in response thereto transmits control signals to a number of solenoid valve driving stages, arranged as output means, or driving stages of like means, thereby regulating the brake pressures in the brake circuits of individual wheels.

Such regulating systems are intended to prevent wheel locking during a braking sequence, by automatically regulating the brake pressure in respective wheel brake circuits relative to a predetermined reference level for a detected wheel retardation, change in wheel speed or wheel slip in relation to the vehicle or in relation to the optimal braking power of a wheel on a prevailing road surface. When one or more wheels of a vehicle tend to lock, the electronic regulating system should be capable of causing a decrease in the brake pressure in respective wheel brake circuits so as to enable the wheel in question to accelerate to a higher speed. This means that a limit speed corresponding to the reference level is normally passed before the pressure in a wheel brake circuit is reduced and that the wheel in question, at a subsequent free-running (unbraked rotation) towards the idling speed, re-passes the limit speed, although in the latter case while accelerating, the brake pressure being re-established and permitted to increase until the wheel during the retardation sequence again reaches the limit speed. In this way, there, is imparted to the vehicle wheel a pulsating braking effect which oscillates around the limit speed of the reference level, although the limit speed itself can vary in relation to the conditions under which braking takes place.

It is also known to equip electronic control systems with means for constantly regulating the brake pressure medium in respective wheel brake circuits, in order to constantly give the vehicle wheels a limit speed corresponding to the predetermined reference level, which speed, similarly to a pulsating regulating system, may also constitute a limit speed which corresponds to a maximum braking force on prevailing road surfaces.

Irrespective of how electronic regulating systems are constructed and adapted to detect a locking tendency of vehicle wheels, they require a signal departing from the detector unit to control a so-called driving stage, which in turn is intended to regulate the valve function for a brake pressure medium in the braking circuit of an individual wheel. Depending on the output signal of the driving stage, at least one solenoid valve or similar regulating device is operated. In the case of a pulsating regulating system, a brake-pressure decreasing output signal eminating from the driving stage causes the ordinary brake system of the vehicle to be made temporarily inoperative or the function of the system to be greatly reduced, while an output brake-pressure increasing control signal from the driving stage causes the ordinary brake system of the vehicle to be made operative again.

The main purpose of the control unit according to the present invention is to monitor the aforementioned electronic regulating system and to this end is mainly characterized in that a delay circuit is arranged to sense the signal voltage in a line connecting the detector unit to a driving stage, and to activate a comparator circuit connected to the delay circuit when the control signal of the detector unit causes the braking effect of one or more wheels of the vehicle to cease for a period of time longer than that required with a normal transient sequence for the regulating system, the comparator circuit being arranged to energize a switch for the driving stage in question when activated, so that its output signal changes sign and causes the solenoid valve to be reset for connection with the ordinary, normal braking system of the vehicle.

In order to indicate that a malfunction has occurred in the circuit components before the respective driving stages, the comparator circuit of the control unit according to the invention is also suitably arranged to excite, when activated, a power stage for a signal lamp circuit or the like incorporated in the control unit and arranged to give an alarm signal.

In accordance with the invention, in order to indicate malfunctions in respective driving stages of the regulating system, a delay circuit is arranged to sense, via a transistor or similar component connected as a sign reversing device, the signal voltage in a line from a driving stage to a solenoid valve or the like, and to activate a comparator circuit connected to the delay circuit when the output signal of the driving stage causes nullification of the braking effect in a wheel brake circuit controlled by the driving stage for a period of time longer than required with a normal transient sequence for the regulating system, the comparator circuit being arranged to excite, when activated, the power stage for the alarm lamp circuit, so that an alarm signal is given.

The control unit of the invention is suitably connected to the regulating system in a manner whereby the unit individually senses and regulates the transmission of signals in a number of connections from the detector unit to respective driving stages, while an alarm indication lamp circuit may comprise a unit common to all sensing functions, preferably with a warning lamp mounted on the instrument panel of the vehicle.

The monitoring principle according to the present invention thus provides for an alarm signal and for automatic disengagement of the regulating system when a malfunction occurs for example in the input means, the detector unit or the connection therebetween, while a malfunction in one of the driving stages merely causes the warning lamp to light up, informing the driver of the vehicle that steps must be taken with regard to the regulating system. This latter, which causes diminished performance of those wheels in a braking circuit whose braking pressure medium is intended to be controlled by the driving stage in question, cannot, however, by considered a catastrophy, since they cannot reasonably occur simultaneously on all driving stages in the regulating system.

The invention will now be described in more detail with reference to a control unit for a pulsating regulation system which senses and regulates the speed of each individual vehicle wheel. A control unit for monitoring such a regulating system includes in accordance with the invention four monitoring blocks of mutually identical construction and function, and the following description will therefore be made with reference to only one such block.

In the drawing

FIG. 1 is a block diagram showing the manner in which the control unit is connected to the regulating system and FIG. 2 illustrates the circuit components of a monitoring block.

The regulating system illustrated in FIG. 1 is arranged in a vehicle having a conventional braking system, including a number of wheel brake circuits capable of being regulated with brake pressure media. Arranged in a known manner in each of the wheel brake circuits is a wheel brake cylinder (not shown) which, when a braking sequence is initiated by means of a brake pedal (not shown) or the like, applies a braking force to a vehicle wheel 1 by actuation of the actual braking means of the wheel 1. In the illustrated embodiment, the actual braking members of the wheel include a brake disc 2 securely mounted on the wheel 1 and brake calipers 3 supporting the wheel brake cylinder and being securely mounted to the vehicle.

With respect to the generation of braking pressure, the members of the ordinary braking system of the vehicle may be of a conventional type and as such may be arranged separately from the electronic regulating system system, a valve unit being controlled by the electronic regulating system for regulating the brake pressure in respective wheel brake circuits. However, in accordance with a selected embodiment, the aforementioned members may also be adapted for connection to a separate brake pressure regulating unit (not shown). In the latter case, the respective wheel brake circuits of the braking system are connected to the brake pressure assembly in response to the application of control signals of the regulating system to at least one solenoid valve 4 in each wheel brake circuit. In a pulsating regulating system, the solenoid valve is arranged to take one of two alternative positions, which provide open or closed communications between the pressure generating unit and the wheel brake circuits in question.

A wheel lock prevention regulating system is normally intended for individual regulation of the braking action of a particular vehicle wheel, so that a reference level predetermined for the wheel with respect to speed, retardation or slip is maintained during a braking sequence. In this respect it is necessary that the speed or change in speed of the individual wheel 1 can be measured during the braking sequence. For this purpose, there is firmly secured on each wheel 1 a toothed wheel 5 which co-acts with a stationary magnetic transducer 6 located in the vicinity of the wheel 1 and arranged to transmit pulses for each tooth which passes the transducer 6. The frequency of a pulse train generated in this manner represents the instantaneous angular speed of the wheel at each measuring operation.

The pulses are transmitted to a common detector unit 7 mounted in the vehicle, which unit, depending on the regulating principle of the system, is arranged, to compare the received instantaneous value for the speed of a wheel with a reference level. Irrespective of which measuring method the regulating system is adapted for, the function of the detector unit 7 is to detect, by comparing and calculating the signals received, a locking tendency of the vehicle wheel 1 and to produce an electric magnitude representing the instantaneous braking power of the wheel. In the selected embodiment of the pulsated regulating system, the aforementioned magnitude is converted to a digital signal which takes the value of a logical one or zero, depending upon the status of the indicated magnitude in relation to a magnitude corresponding to a predetermined reference level for the braking sequence. A thus processed output signal from the detector unit 7 controls a driving stage 8 which, with an amplified output signal, controls and regulates the operative and inoperative state of the solenoid valve 4 for the wheel brake system in question.

When a one-signal is transmitted, which means that the limit speed for a reference level predetermined for the wheel 1 has been passed during the braking sequence, with subsequent risk for wheel locking the solenoid valve 4 closes the connection between brake pressure generating unit and the wheel brake cylinder and causes the brake pressure to decrease so that the wheel speed increases. When the wheel 1 again passes the limit speed of the reference level during such a free-running, output signals from the detector units 7, and consequently also the output signals from the driving stage 8, change sign and the connection between the brake pressure generating unit and the wheel brake cylinder is re-opened by the solenoid valve 4, causing an increased braking force to be applied to the brake means, whereafter the regulating sequence is repeated as before. In a similar manner, the vehicle wheel 1 is given a pulsating braking action, oscillating around the limit speed of the predetermined reference level.

The purpose of the control unit according to the invention is to prevent the output signals from the detector unit 7 which energize the driving stages 8 from nullifying the braking effect of one or more vehicle wheels 1 during a period of time longer than that required in a normal transient sequence in the regulating system. To this end, the control unit includes a monitoring block for each output line connection from the detector unit 7 and driving stages 8. The monitoring blocks are identical to each other, and to illustrate the function of the control unit, the following description will be made with reference to how one single monitoring block is arranged to monitor the regulating function of a wheel brake circuit of a vehicle.

A monitoring block in the control unit of the invention is intended to sense signal voltages in outgoing lines 9,10 from the detector unit 7 and a driving stage 8 respectively and to compare these voltages with certain criteria of probability. The voltages are sensed and compared in two sensing circuits, here designated sensing means 11. The sensing means 11, in response to signal voltages supplied thereto via two input lines 12,13, of which one is connected to the output line 9 from the detector unit 7 and the other to the output line 10 from the driving stage 8, is arranged to transmit control signals in the presence of abnormal signal voltages to a pole changer or switch 14 and a power transistor 17 for a lamp circuit 15, which is arranged in the control unit and which is common to all monitoring blocks. The pole changer 14, which in the illustrated embodiment comprises a conventional transistor, is connected to the line 9 between the detector unit 7 and the driving stage 8 and is adapted to throttle the regulating current to a power transistor 16 in the driving stage 8 when excited, whereby the output signal of the driving stage 8 changes sign and operates the solenoid valve 4 to permit fluid connection between the brake pressure unit and the wheel brake cylinder.

This automatic pole reversal of the output signal of the driving stage 8 will only occur when the signal voltage applied to the sensing means 11 via the line 12 gives rise to an abnormally high voltage level in the sensing circuit which senses the output signals of the detector unit 7. At the same time, the sensing means 11 also excites the power transistor 17 in the monitoring block, whereupon a warning lamp in the common lamp circuit 15 is illuminated and warns that a malfunction has probably occurred in the detecting means of the regulating system.

The lamp circuit 15 will also operate when a one-signal from the driving stage 8 is maintained for a period of time longer than that required by the regulating system and thereby causing the input signal voltage to the sensing means 11 via the line 13 to give rise to an abnormally high voltage level in the sensing means which senses the output signals of the driving stage 8. Consequently, a signal voltage sensed in this manner will not initiate the aforementioned pole reversal function for the driving stage 8.

The two sensing circuits in the sensing means 11 consist of substantially the same circuit components and consequently their functions as voltage sensing and voltage comparing means are alike, as will be hereinafter described.

Output signals from the detector unit 7 to the power transistor 16 of the driving stage 8 are normally transmitted via a resistance 18. As the output signals are transmitted, the voltage of the signals is sensed by a delay circuit 19 connected by line 12 to line 9. The delay circuit 19 consists of a capacitor 20 which is charged, via a resistance 21, by the signal voltage and is discharged via a diode 22 connected in parallel with the resistance 21 when the output signal of the detector unit 7 changes sign and, in the illustrated embodiment, throttles the line connection 9 between the detector unit 7 and the driving stage 8.

In the case of normal regulator function, the voltage charged in the capacitor is unable to reach the voltage level required to excite a comparator circuit 23 connected with the delay circuit 19. The comparator circuit 23 includes a transistor 24 which is connected to the delay circuit 19 via a resistance 25 when a sensed output signal from the detector unit 7 gives rise to an abnormally high voltage level in the capacitor 20. For this purpose, the resistance 25 is adapted to correspond to a transfer level suitable for the regulating function with respect to time.

When the transistor 24 is connected, two of its output lines 26, 27 are energized and the transistor of the pole reverser 14 and the power transistor 17 for the lamp circuit 15 are excited via a resistance 28,29 in respective lines, the one signal of the driving stage 8 changing to zero-signal and the warning lamp lighting up.

The output signal of the driving stage 8 is sensed analogously with the foregoing sensing function, and to enable this a transistor 30 operative as a sign reverser is connected in the line 10. The transistor 30 is excited via a resistance 31 by one-signals of the driving stage 8 and transmits the same to a delay circuit 32, where the voltage of said signals is sensed and regulated by a comparator circuit 33. When the comparator circuit 33 is energized by an abnormally high voltage level occurring in the delay circuit 32, a line 34 passing from the comparator circuit 33 is energized and, via a resistance 35, energizes the power transistor 17 of the lamp circuit 15. The circuit components of the means 11 are so adapted with respect to each other that the transistor of the switch 14 is not energized when malfunctions occur solely in the output signal of the driving stage 8.

Although the control unit of the present invention has been described with reference to a pulsating regulating system, the invention is not restricted thereto since the control unit can equally as well be connected to regulating systems which continuously regulate the valve function of a brake pressure medium.

In such systems, the wheel speed is normally regulated by a servo-system and the valve signal constitutes an error signal in the servo-system. If the servo-system functions in the intended manner, the error signal should lie within certain margins and, in order for the control unit to function in the manner intended according to the invention, comprises the time during which the error signal lies outside the aforementioned margins. Because of this, the requirement on the accuracy of the sensing circuits is greater with continuous regulating systems than with pulsating regulating systems, which means that the comparator circuits should be constructed slightly differently with respect to the two systems, although in principle the control unit in both cases is constructed analogously with the control unit of the accompanying claims.

What I claim is:

1. A control unit for monitoring electronic regulating systems for braking means for wheeled vehicles comprising detector means responsive to the speed of rotation of a wheel of the vehicle for generating respectively distinctive signals above and below a predetermined reference speed of rotation, means for controlling the brakes of the vehicle, means responsive to one of the signals for actuating said control means to decrease brake pressure, at least one sensing means including a delay circuit and a comparator circuit actuated by said signals for reversing the signal for operating said control means to increase brake pressure when said one signal has actuated said control means for a period of time longer than that required for the normal transient sequence of operation for the regulating system, whereby when the brakes have been released to prevent locking for such longer period of time, brake pressure will be increased by said control means.

2. A control unit as claimed in claim 1 and further comprising a warning means connected to said comparator circuit for activation when said at least one sensing means is actuated by said signals.

3. A control unit as claimed in claim 1 wherein said at least one sensing means comprises a first sensing means connected to said means for actuating said control means and a second sensing means connected between said detector means and said signal responsive means for actuating said control means.

* * * * *